March 31, 1964 H. MEHLHORN 3,127,473

TELEVISION RECEIVER PROVIDED WITH AN ARRANGEMENT FOR OBTAINING A CONTROL QUANTITY CORRESPONDING TO THE DEGREE OF DETUNING

Filed Oct. 12, 1960 2 Sheets-Sheet 1

INVENTOR
HELMUT MEHLHORN

BY Frank R. Trifari
AGENT

INVENTOR
HELMUT MEHLHORN
BY Frank R. Trifari
AGENT

United States Patent Office 3,127,473

Patented Mar. 31, 1964

3,127,473

TELEVISION RECEIVER PROVIDED WITH AN ARRANGEMENT FOR OBTAINING A CONTROL QUANTITY CORRESPONDING TO THE DEGREE OF DETUNING

Helmut Mehlhorn, Mannheim-Gortenstadt, Germany, assignor to North American Philips Company, Inc., New York, N.Y., a corporation of Delaware Filed Oct. 12, 1960, Ser. No. 62,224

Claims priority, application Germany Nov. 30, 1959

9 Claims. (Cl. 178—5.8)

The invention relates to a television receiver provided with an arrangement for obtaining a control quantity corresponding to the degree of detuning.

In known arrangements of this kind, a resonant circuit tuned to the image or sound carrier is coupled to the intermediate frequency amplifier. The frequency results in undesirable loading or necessitates additional amplification. This is especially the case if not a single circuit but a discriminator is used which delivers an output voltage which at correct tuning provides a certain control quantity which, when the receiver is more or less detuned, is increased or decreased.

Undesirable loading of the intermediate frequency amplifier may be avoided if the intermediate frequency voltage to be used for tuning indication is taken from the video-detector, in particular after the video-detector diode. At this point, there is in any case considerable loading for the intermediate frequency oscillations, which is allowed for in the design of the amplifier, so that additional loading can be dealt with without material difficulty. At this point, the intermediate frequency voltage is not very high, however, so that in the case of a normal discriminator further amplification is required.

In a television receiver of the above-mentioned kind, these disadvantages are avoided and with a minimum expenditure and without additional frequency amplification, a discriminator arrangement providing the desired control quantity is obtained if in accordance with the invention an intermediate frequency voltage is taken from the output of the intermediate frequency amplifier, preferably from the video-detector, and is applied to an auxiliary resonant circuit tuned to a frequency intermediate the frequencies of the image and the sound carrier, and the voltage produced across this resonant circuit is rectified and connected in series with a part of the direct voltage appearing at the video-detector, preferably so that the combined voltage serving as a control quantity is approximately zero at correct tuning.

Since the control quantity obtained also depends upon the mean image brightness, it may be of advantage for the combined voltage to be applied to a device which is conducting only at instants at which the video-signal has a reference level, for example, at black level or at the pulse peaks of line and frame synchronizing pulses. The control quantity, after smoothing, is obtained from the output of this device.

Figure 1:
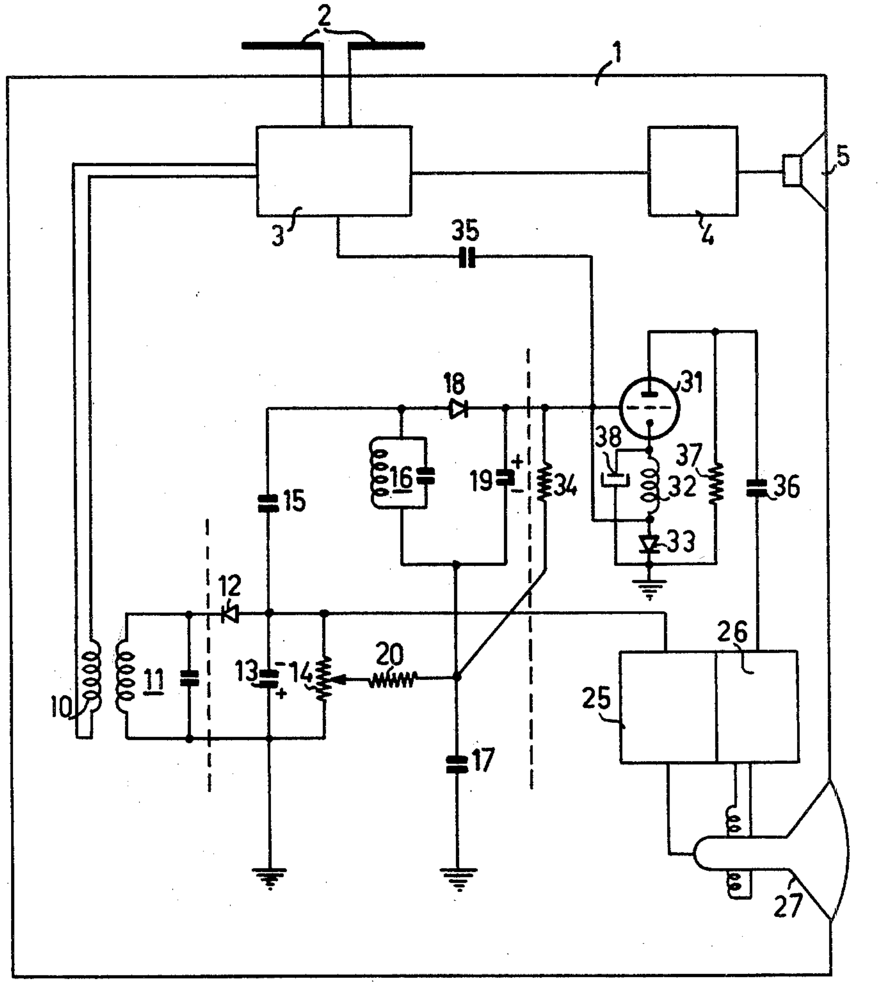
Figures 2, 3, 4:
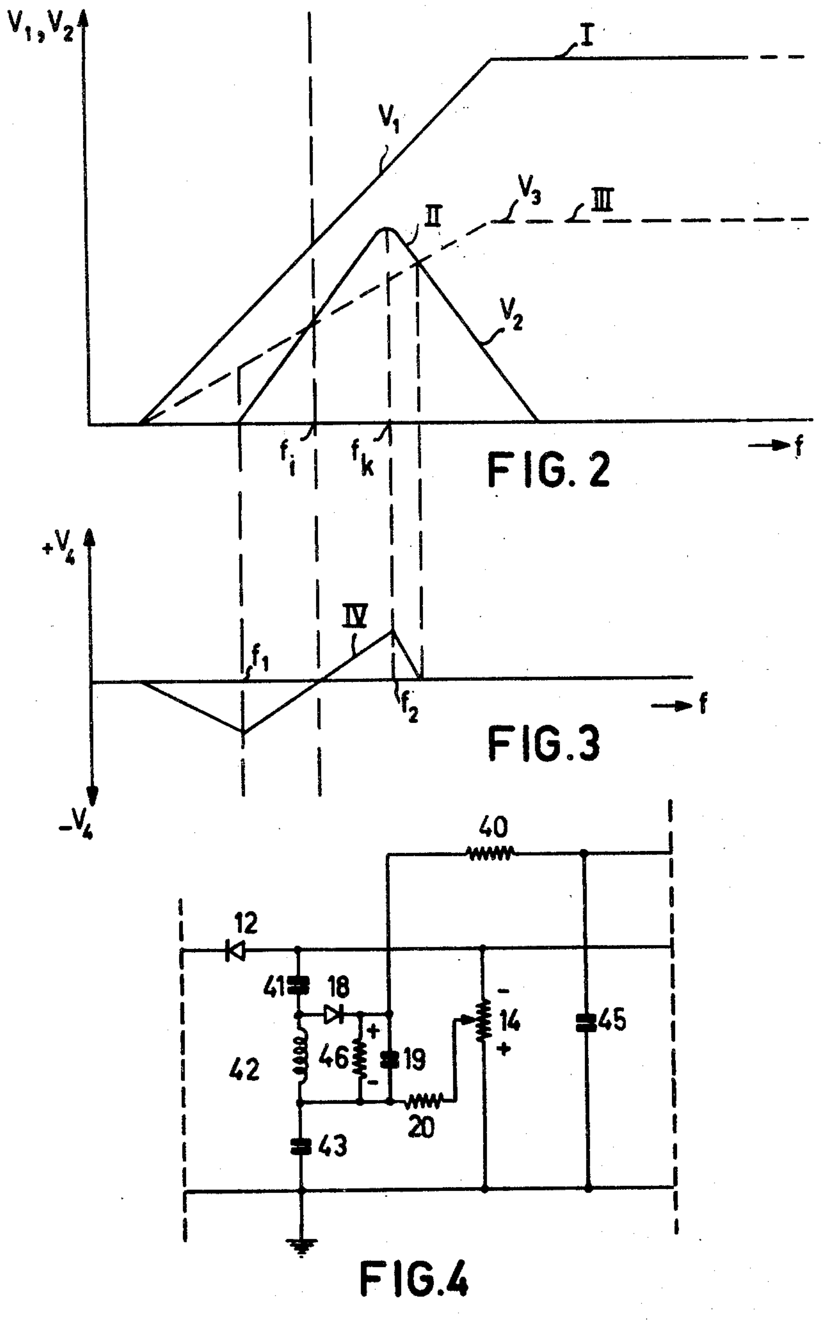

The invention will now be described more fully by way of example with reference to the accompanying drawings, of which:

FIGURE 1 shows, partly in block schematic form, a television receiver in accordance with the invention, FIGURES 2 and 3 show diagrams illustrating the discriminator action of the arrangement, and FIGURE 4 shows a further embodiment.

Oscillations received by an aerial 2 are supplied to a television receiver 1, further amplified in a circuit 3 and converted in frequency.

The oscillations modulated by the sound signal are supplied to a sound amplifying circuit 4 to which a loudspeaker 5 is connected.

The intermediate frequency oscillations modulated by the image signals are supplied by the circuit 3 to an inductance 10 inductively coupled with a resonant circuit 11. One end of circuit 11 is grounded. The other end of the resonant circuit 11 is connected to the cathode of a video-detector diode 12. The anode of the diode is connected to ground through a charging capacitor 13. A load resistor 14, in the form of a potentiometer, is connected in parallel with capacitor 13.

Due to the fact that the capacitance value of the capacitor 13 is not too high, a residual signal with the frequencies of the intermediate frequency signal is set up across capacitor 13. This residual intermediate frequency signal is supplied through a small coupling capacitor 15 to an auxiliary resonant circuit 16 the other end of which is connected to ground through a capacitor 17. The source which delivers the intermediate frequency signal to the capacitor 15 has a comparatively low internal resistance. It may therefore be desirable to connect the capacitor 15 to a tapping of the inductance of this resonant circuit instead of the end of the inductance. In that case, the amplitude of the intermediate frequency signal at the anode of diode 18 is increased with respect to the case as shown in FIGURE 1. The resonant circuit 16 thus delivers the intermediate frequency signal to the anode of diode 18 the cathode of which is connected in series with a capacitor 19. A series resistor 20 is connected between the ungrounded terminal of the capacitor 17 and the sliding contact of the load resistor 14.

Across capacitor 13 are also produced in known manner the detected video-signals which are, if desired after additional filtering to eliminate the residual intermediate frequency signal, applied to a video-amplifier 25 and from there to a device 26 connected thereto. In the device 26 the sawtooth deflecting currents are developed for deflecting the electron beam in the display tube 27. The brightness control electrode and the deflecting coils of the display tube 27 are connected to the stages 25 and 26 so that the image received can be displayed on the screen of the tube 27. Across the resonant circuit 11 a voltage $V_1$ is produced which as a function of frequency shows an approximate variation as shown by a curve I of FIGURE 2. The ascending branch of this curve is the known Nyquist edge.

Curve II of FIGURE 2 shows the frequency characteristic curve of the resonant circuit 16. Due to the fact that only a residual signal is set up across capacitor 13, the voltage $V_2$ across resonant circuit 16 is always smaller than the voltage $V_1$. The circuit 16 is tuned to a resonant frequency $f_k$ just beyond the frequency $f_1$ of the image carrier. Hence, due to the action of rectifiers 12 and 18 respectively, the D.C. voltages of the polarities indicated in FIGURE 1 are set up across capacitors 13 and 19 the values of which also vary as indicated by curves I and II respectively as a function of frequency, because rectifiers 12 and 18 detect the amplitudes of the signals applied to them.

The voltage rectified by means of rectifier 12 is attenuated by the potentiometer 14. Thus, at the sliding contact of potentiometer 14, a voltage $V_3$ is developed which, as a function of frequency, is shown by means of curve III. The sliding contact on potentiometer 14 is adjusted in such a manner that for the frequency $f_1$ the voltage $V_3$ is at least approximately equal in value to the voltage across the capacitor 19. The voltage $V_3$ taken from potentiometer 14 is applied by way of the series resistor 20 to the capacitor 17. Resistor 20 and capacitor 17 serve as further smoothing means for the residual intermediate frequency signal and, as the case may be, for the video-signals of higher frequency. Therefore, a D.C. voltage of negative polarity with respect to ground appears across capacitor 17. The amplitude of this voltage, as a function of frequency, is indicated by the curve III. A D.C. voltage of positive polarity with respect to the junction of capacitor 17 and resistor 20 appears across the capacitor 19. The amplitude of this voltage, as a function of frequency, is indicated by the curve II. Thus, at the control grid of tube 31, a D.C. voltage $V_4$ is provided, which is the sum of the voltages of opposite polarities set up respectively across capacitors 17 and 19. The value of the D.C. voltage $V_4$ as a function of frequency is shown in FIGURE 3 by means of the curve IV.

Thus, as will be clear from FIGURE 3, a discriminator curve is obtained which has, between frequencies $f_1$ and $f_2$, the desired slope for fine tuning of the circuit 3 in particular of an oscillator included in circuit 3.

This is rendered possible, for example, by connecting in the cathode circuit of the tube 31, the series-combination of a high-frequency choke 32 and a diode 33 connected to ground. The grid of tube 31 is also connected to the junction of resistor 20 and capacitor 17 through a leak resistor 34. The current flowing through the tube 31 and hence the internal impedance of the diode 33 are controlled in accordance with the voltage $V_4$. The anode of this diode is connected to the choke 32 and also, through a capacitor 35, which may have a value of a few pf., to a point of a resonant circuit in the circuit 3, which circuit determines the tuning of the television receiver. By means of the series-combination of the capacitor 35 and the controlled diode 33 a variation in the tuning, in particular fine tuning, can be obtained.

The voltages across capacitors 13 and 19 also contain a portion corresponding to the mean image brightness so that the voltage $V_4$ may vary in dependence of the mean image brightness. In order to avoid this variation, there is applied to the anode of tube 31 a supply voltage which is active during the constant reference level determined by the synchronizing pulses. A pulsatory voltage of this kind can be taken through a capacitor 36 from the deflection device 26. The anode of the tube 31 is connected to earth through a working resistor 37. Due to the action of the pulsatory supply voltage applied to the anode, the tube 31 will draw a pulsatory-like anode current. To avoid flowing of this pulsatory current through the controlled diode 33, the cathode of tube 31 is connected through a large capacitor 38, of, for example, 10 to 50 $\mu$f., to earth. So the fine tuning is not influenced by means of this pulsatory current.

The diode 18 may be replaced by a controlled amplifying and rectifying element, for example a transistor, which may also be pulse-keyed, if desired. Thus, the output voltage of the element 18 can be amplified and rectified with respect to the input intermediate frequency signal applied thereto and the attenuation by means of potentiometer 14 can be decreased in accordance therewith. So the discriminator voltage $V_4$ is increased with respect to the case shown in FIGURE 1.

It will be clear that the resonance frequency $f_k$ of the circuit 16 can be situated further beyond the image carrier frequency $f_1$. In that case, the range between frequencies $f_1$ and $f_2$ is increased and thus a greater range for fine tuning action is obtained. By doing so, it is only necessary to ensure that the slope of curve II is always much greater than the slope of curve III because otherwise the slope of curve IV is too small.

As shown in FIGURE 4, the coupling capacitor 15 and the inductance of the auxiliary resonant circuit 16 may also be designed as a series resonant circuit connected to the anode of diode 12. Thus, the expenditure can be reduced and a larger D.C. voltage can be obtained across the capacitor 19.

In FIGURE 4, a modified embodiment of the portion of the circuit situated between the vertical broken lines of FIGURE 1 is shown.

Between the anode of the diode 12 and earth is connected the series-combination of a capacitor 41, an inductance 42 and a smoothing capacitor 43. The circuit with capacitor 41 and inductance 42 is tuned as a series resonant circuit to a frequency $f_k$ intermediate the image and sound carrier frequencies. Preferably, the capacitor 43 has a comparatively large capacitance value with respect to capacitor 41. The residual intermediate frequency signal which is set up across the inductance 42 and the amplitude of which for the resonance frequency $f_k$ is increased with respect to the voltage at this frequency between the diode 12 and earth, is supplied to the anode of the diode 18. The cathode of diode 18 is connected through the parallel connection of capacitor 19 and resistor 46 to the other end of inductance 42. Hence, a rectified voltage, with a polarity as indicated in FIGURE 4, is produced across capacitor 19. The lower end of the inductance 42 is connected through a decoupling resistor 20 to the sliding contact of the resistor 14. At the junction of the diode 18 and the capacitor 19 is set up the sum voltage $V_4$ of the positive D.C. voltage set up across capacitor 19 and of the negative D.C. voltage at the sliding contact of potentiometer 14. The said sliding contact is adjusted such that for the frequency $f_1$ the voltage $V_4$ is equal to zero. (See also FIGURES 2 and 3.) The voltage $V_4$ can be applied through a series resistor 14 and a parallel capacitor 45, acting as a smoothing device, to the control grid of tube 31. Thus, the discriminator voltage with respect to earth is produced across capacitor 45.

It will be clear that the voltage $V_4$ (discriminator voltage) may be used for tuning indication instead of for automatic frequency tuning as described above. In that case, it is only necessary to control a tuning indicator element with the voltage $V_4$.

What is claimed is:

1. A television receiver having means for providing a control quantity dependent upon the tuning of said receiver, said receiver comprising a source of intermediate frequency signals, first and second rectifier means, means applying said intermediate frequency signals to said first rectifier means to provide first unidirectional rectified signals, resonant circuit means tuned to a frequency intermediate the image and sound carrier frequencies of said intermediate frequency signals, means applying said intermediate frequency signals to said resonant circuit means, means connecting said resonant circuit means to said second rectifier means to provide second unidirectional rectified signals, and means for combining said first and second rectified signals to provide said control quantity.

2. A television receiver having means for providing a control voltage dependent upon the tuning of said receiver, said receiver comprising a source of intermediate frequency signals, video detector means, means applying said intermediate frequency signals to said video detector means to provide a direct voltage and residual intermediate frequency signals, a resonant circuit tuned to a frequency intermediate the image and sound carrier frequencies of said intermediate frequency signals, means applying said residual signals to said resonant circuit, auxiliary detector means, means connecting said auxiliary detector means to said resonant circuit to provide a rectified voltage, and means combining said direct voltage and said rectified voltage to provide said control voltage.

3. The receiver of claim 2, in which said resonant circuit is a parallel resonant circuit.

4. The receiver of claim 2, in which said resonant circuit is a series resonant circuit.

5. A television receiver having means for providing a control voltage dependent upon the tuning of said receiver, said receiver comprising a source of intermediate frequency signals, potentiometer means having one end connected to a point of reference potential, first rectifier means having a first electrode connected to the other end of said potentiometer means, means applying said intermediate frequency signals between the other electrode of said rectifier means and said point, a resonant circuit tuned to a frequency intermediate the image and sound carrier frequencies of said intermediate frequency signals, first capacitor means connecting at least a portion of said resonant circuit means between said other end of said potentiometer means and the tap of said potentiometer means, second rectifier means and second capacitor means connected serially in that order between said resonant circuit means and said tap, and means for deriving said control voltage from the junction of said second rectifier means and second capacitor means.

6. The receiver of claim 5, in which said first electrode is the same type of electrode as the electrode of said second rectifier means connected to said resonant circuit means.

7. A television receiver having means for providing a control quantity dependent upon the turning of said receiver, said receiver comprising a source of intermediate frequency signals, first and second rectifier means, means applying said intermediate frequency signals to said first rectifier means to provide first rectified signals, resonant circuit means tuned to a frequency intermediate the image and sound carrier frequencies of said intermediate frequency signals, means applying said intermediate frequency signals to said resonant circuit means, means connecting said resonant circuit means to said second rectifier means to provide second rectified signals, means for combining said first and second rectified signals to provide a voltage dependent upon the tuning of said receiver, unilateral conductive means having an input circuit and an output circuit, means connected to render said unilateral conductive means conductive only when said intermediate frequency signals have a reference level, means supplying said dependent voltage to said input circuit, and means for obtaining said control quantity from said output circuit.

8. A television receiver having means for providing a control quantity dependent upon the tuning of said receiver, said receiver comprising a source of intermediate frequency signals, first and second rectifier means, means applying said intermediate frequency signals to said first rectifier means to provide first rectified signals, resonant circuit means tuned to a frequency intermediate the image and sound carrier frequencies of said intermediate frequency signals, means applying said intermediate frequency signals to said resonant circuit means, means connecting said resonant circuit means to said second rectifier means to provide second rectified signals, means for combining said first and second rectified signals to provide a voltage dependent upon the tuning of said receiver, an electron discharge device having a control grid, an anode, and a cathode, means applying said combined signals to said control grid, a source of a pulse voltage occurring when said intermediate signals have a reference level, means applying said pulse voltage to said anode, and means for deriving said control quantity from said cathode.

9. A television receiver having means for providing a control voltage dependent upon the tuning of said receiver, said receiver comprising a source of intermediate frequency signals, potentiometer means having one end connected to a point of reference potential, first rectifier means having a first electrode connected to the other end of said potentiometer means, means applying said intermediate frequency signals between the other electrode of said rectifier means and said point, a series circuit of a first capacitor, and inductor, and a second capacitor connected in that order between said other end of said potentiometer and said point, said first capacitor and inductor being resonant at a frequency intermediate the image and sound carrier frequencies of said intermediate frequency signals, means connecting the junction of said inductor and second capacitor to the tap of said potentiometer, second rectifier means and impedance means serially connected in that order between the junction of said first capacitor and said inductor and the junction of said second capacitor and said inductor, and means for deriving said control voltage from the junction of said second rectifier means and said impedance means.

References Cited in the file of this patent

UNITED STATES PATENTS

| | | |
|---|---|---|
| 2,504,663 | Dome | Apr. 18, 1950 |
| 2,904,630 | Bruch et al. | Sept. 15, 1959 |
| 2,943,145 | Parker | June 28, 1960 |
| 2,953,637 | Baugh | Sept. 20, 1960 |

UNITED STATES PATENT OFFICE

CERTIFICATE OF CORRECTION

Patent No. 3,127,473 March 31, 1964

Helmut Mehlhorn

It is hereby certified that error appears in the above numbered patent requiring correction and that the said Letters Patent should read as corrected below.

Column 5, line 16, for "turning" read -- tuning --; line 33, for "supplying" read -- applying --; column 6, line 23, for "and", first occurrence, read -- an --.

Signed and sealed this 18th day of August 1964.

(SEAL)
Attest:

ERNEST W. SWIDER
Attesting Officer

EDWARD J. BRENNER
Commissioner of Patents